W. S. GUBELMAN.
COASTER BRAKE.
APPLICATION FILED APR. 6, 1907. RENEWED OCT. 9, 1913.
1,102,402.  
Patented July 7, 1914.
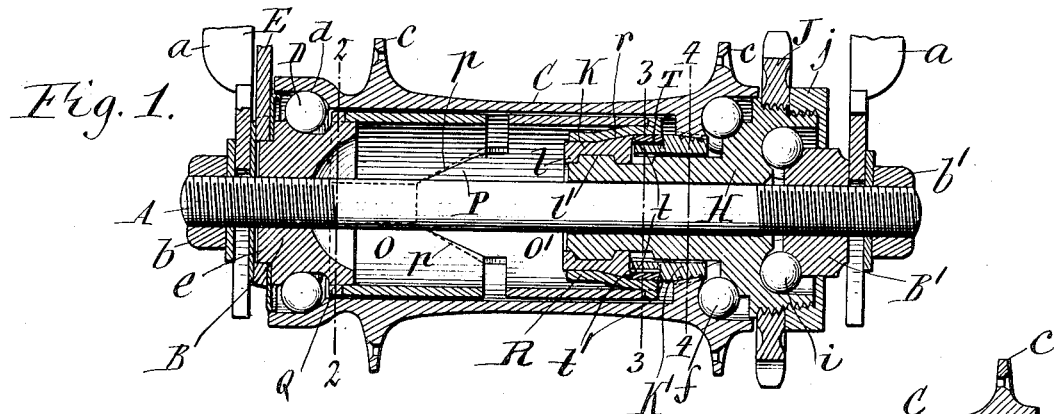
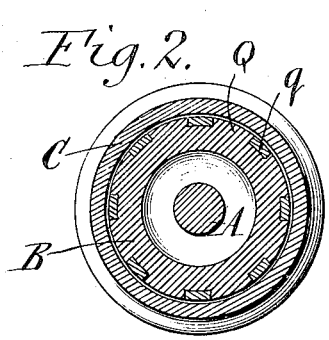
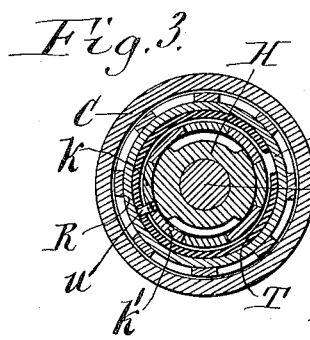
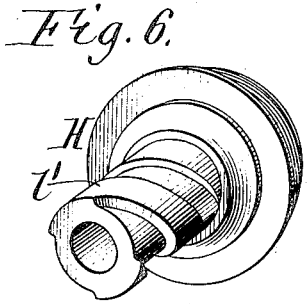
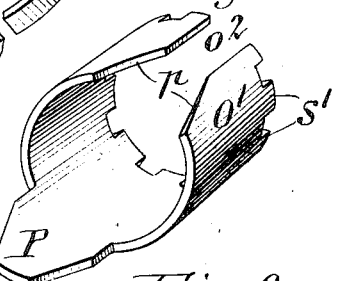
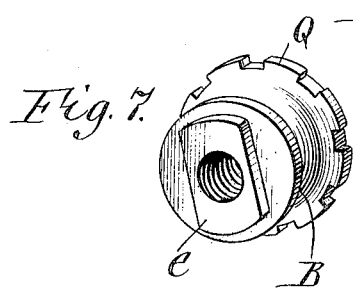
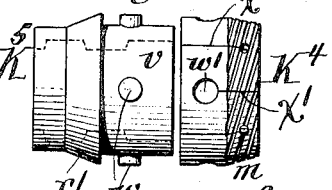
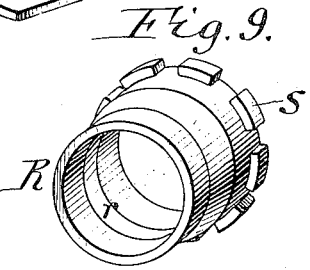
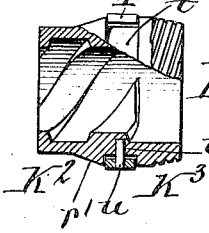
Witnesses:  
Richard Sommer  
Gustav W. Hora
Inventor  
William S. Gubelman  
by Geyer & Popp  
Attorneys

UNITED STATES PATENT OFFICE.

WILLIAM S. GUBELMAN, OF BUFFALO, NEW YORK.

COASTER-BRAKE.

1,102,402.

Specification of Letters Patent.

Patented July 7, 1914.

Application filed April 6, 1907, Serial No. 366,663. Renewed October 9, 1913. Serial No. 794,327.

*To all whom it may concern:*

Be it known that I, WILLIAM S. GUBELMAN, a citizen of the United States, residing at Buffalo, in the county of Erie and State of New York, have invented a new and useful Improvement in Coaster-Brakes, of which the following is a specification.

This invention relates to a coaster brake which is more particularly designed for use in bicycles but which may also be used for other purposes.

The object of this invention is the production of a brake and clutch for this purpose which are very efficient and reliable in operation, which can be produced at comparatively low cost, which are so constructed that the wear on the parts is reduced to a minimum and which are not liable to slip or become inoperative by reason of excessive oiling of the parts.

In the accompanying drawings: Figure 1 is a longitudinal section of a bicycle hub equipped with my improved coaster brake. Figs. 2, 3 and 4 are transverse sections of the same taken in the correspondingly numbered lines in Fig. 1. Fig. 5 is a fragmentary sectional view of the hub barrel detached from the rest of the parts. Figs. 6, 7, 8 and 9 are detached perspective views of some parts of the brake and clutch. Fig. 10 is a detached side elevation of one form of the driven sleeve forming part of the brake and clutch. Fig. 11 is a perspective view of the friction ring forming part of the brake, shown in Figs. 1, 3 and 10. Fig. 12 represents a fragmentary sectional view of a modified form of the driven sleeve of the brake and clutch. Fig. 13 is a side elevation showing another modification in the form of the driven sleeve.

Similar letters of reference indicate corresponding parts throughout the several views.

A represents the axle of the wheel which is secured to the fork or frame members $a$, so as to be held against turning, the means for this purpose shown in the drawings consisting of ball cones B, $B^1$ screwed on the threaded end portions of the axle and engaging with the inner sides of the frame members and screw nuts $b$, $b^1$ applied to the outer ends of the axle and engaging with the outer sides of the fork members.

C represents the main hub barrel which rotates concentrically about the axle and is provided near opposite ends with external annular flanges $c$ to which the spokes of the wheel are secured in any suitable manner. One end of this barrel, preferably the left end, as shown in the drawings, is journaled by means of an annular row of balls D interposed between the stationary left cone B and a race-way or cone $d$ formed in this end of the hub barrel. The cone D is positively held against turning by means of an arm E secured at one end in any suitable manner to the adjacent frame member while its opposite end is provided with a flat sided opening which receives a correspondingly shaped boss $e$ on the outer side of the ball cone B. At the opposite end of the hub barrel the same is journaled by means of an interposed row of balls $f$ on a driving sleeve H which rotates about the axle. This driving sleeve is in turn journaled upon the adjacent right end cone $B^1$ by means of a row of balls interposed between said cone and a race-way on the driving sleeve. The latter may be rotated by any suitable means, for instance, by means of a driving mechanism comprising among other things a chain belt which passes around a sprocket wheel J which screws upon the outer end of the driving sleeve and is held thereon by means of a jam nut $j$. Surrounding the inner portion of this driving sleeve is an intermediate or driven sleeve which, as shown in Figs. 1, 3 and 10, is composed of inner and outer tubular sections K, $K^1$ which are arranged side by side on the inner portion of the driving sleeve and are coupled so as to be compelled to rotate together but are free to move axially one relatively to the other by means of interlocking lugs $k$, $k^1$ arranged on the opposing ends of the driven sleeve sections. The inner section K of this pair of sleeve sections is provided in its bore with an internal screw thread $l$ forming practically a screw nut and this thread engages with an external screw thread $l^1$ formed on the inner end of the driving sleeve which latter is equivalent to a screw bolt.

The periphery $m$ of the outer section of the driven sleeve is made conical and outwardly tapering and is adapted to engage with a correspondingly tapering face $m^1$ formed in the bore of the hub barrel adjacent to the inner side of the right hand ball bearing thereof. These conical faces of the driven sleeve and hub barrel form the gripping faces of a clutch whereby the hub barrel and driving mechanism may be connected and disconnected. The threads of the driving sleeve and the driven sleeve trend in the proper directions so that when the driving sleeve is turned forwardly by means of power applied to the sprocket wheel, the action of these threads will cause the driven sleeve to be moved axially outward or toward the right and thereby cause the conical gripping or clutch face of the driven sleeve to engage with the companion face of the hub barrel and produce a driving connection between these parts, whereby the forward rotation of the driving sleeve is transmitted to the hub barrel for rotating it in the same direction. Upon turning the driving sleeve backwardly or holding the same against turning while the hub barrel continues to rotate forwardly, the driven sleeve will continue to rotate with the hub barrel until the action of the screw threads between the driving and driven sleeves has moved the latter axially inward or toward the left sufficiently to operatively disengage the clutch face of the driven sleeve from that of the hub barrel. Thereafter the hub barrel will rotate independently of the driven sleeve and in this position of the parts the wheel is free to be turned in either direction.

It has been found in practice that bicycle riders are apt to oil the mechanism on the interior of the hub barrel excessively when any difficulty is experienced regardless of whether the difficulty is due to lack of oil or other cause. This excessive oiling produces a film of oil upon the opposing clutch faces of the driven sleeve and hub barrel which prevents the same from gripping each other reliably and thus causes slippage between these parts and interference with the proper transmission of power to the hub barrel. To overcome this difficulty and prevent excessive deposit of oil on the opposing clutch faces, each of these faces is scored or otherwise constructed of irregular form so as to produce a plurality of elevated and depressed face portions. By this means any oil which is deposited upon these faces is squeezed off from the high face portions when the two clutch faces come together and caused to run down into the depressed portions of these faces. By this means a drainage is provided which permits the excess oil to be readily displaced from the high or operative parts of the clutch faces and enables them to reliably and firmly engage each other so as to permit of properly transmitting the power from the driving device to the hub barrel. This irregular formation of these clutch faces may be produced in various ways, for instance, as shown in Figs. 5 and 10, the face of the barrel hub may be provided with alternating longitudinal ribs and grooves $n$, $n^1$ and the clutch face of the driven sleeve may be provided with alternating ribs and grooves $n^2$, $n^3$ which are arranged at an angle relatively to those of the hub barrel. By thus arranging the ribs and grooves of the hub barrel and driven sleeve at an angle to each other, the same only engage each other frictionally on their highest faces but do not positively interlock, thereby permitting these parts to slip upon each other until sufficient pressure is applied to the same to cause them to become frictionally coupled.

Between the two ball bearings of the hub barrel within the bore thereof are arranged a plurality of brake sleeves or brake shoes O, $O^1$ each of which is constructed of spring metal and provided on one side with a longitudinal slit $o^2$ so that the same may be expanded for engaging their peripheries with the bore of the hub barrel or contracted for disengaging their peripheries therefrom. As shown in Fig. 1, two of such split brake shoes or sleeves are shown but a greater number may be employed if desired. On their opposing ends these brake sleeves are provided with wedges or V-shaped extensions P, P each of which projects lengthwise from its brake sleeve toward the other brake sleeve and into the slit thereof and engages with correspondingly inclined faces $p$ formed on opposite edges of the slit. Upon moving these brake sleeves axially or lengthwise one relatively to the other, the action of their coöperating wedges and inclined faces causes the sleeves to be expanded and bear with their peripheries against the bore of the hub barrel. Upon moving these brake sleeves axially away from each other, their wedges are withdrawn from their slits, permitting the same to contract and withdraw their peripheries from the bore of the hub barrel. When the hub barrel is thus engaged by the brake sleeves the rotation of the latter is retarded or wholly arrested but when the brake sleeves are disengaged from the hub barrel, the latter is free to rotate in either direction. In order to render these brake shoes effective, they must be held against rotation and this is done by connecting the brake sleeve at the left end of the hub with a stationary part, the preferred means for this purpose shown in the drawings consisting in forming an annular row of teeth or lugs $q$ at the outer end of the left brake sleeve and interlocking the same with a similar row of teeth or lugs Q formed on the periphery of the left ball cone B inwardly from its ball raceway.

Between the bore of the right member of the pair of split brake sleeves and the periphery of the driven sleeve is arranged an abutment sleeve R which may be frictionally connected with or disconnected from the driven sleeve but is positively connected with the right brake sleeve. The frictional connection is preferably produced by constructing the abutment sleeve so that its bore is conical or tapering from right to left, as shown at $r$. This conical bore engages with a correspondingly tapered back $r^1$ on the periphery of the driven sleeve, as shown in Fig. 1. The abutment sleeve is connected with the right hand brake sleeve by means of an annular row of teeth or lugs $s$ arranged at the outer end of the abutment sleeve and interlocking with similar teeth or lugs $s^1$ on the outer end of the right brake sleeve. Upon turning the driving sleeve backwardly, the driven sleeve will be moved axially inward by the action of the screw threads between the same, the driven sleeve being held against turning at this time by the frictional contact between the same and the abutment sleeve. The grip between these parts is increased by the tapering form of their coöperating surfaces. As the driven sleeve moves axially inward it carries the abutment sleeve and right hand brake sleeve in the same direction, thereby causing the respective wedges of both brake sleeves to spread the same into engagement with the hub barrel and retard or arrest the rotation of the latter. Upon turning the driving sleeve forwardly the driven sleeve owing to its frictional connection with the abutment sleeve is held against turning, thus enabling the threads between the driving and driven sleeves to move the latter axially outward and permit the brake sleeves to separate and contract out of engagement with the bore of the hub barrel.

Frictional contact between the driven sleeve and abutment sleeve is required for obtaining the braking effect but during the ordinary rotation of the hub barrel this friction should be eliminated so as not to interfere with the rotation of the hub barrel and driving mechanism and also to avoid unnecessary wear on the parts. When the driven sleeve is depended upon solely to produce a frictional connection between the same and the abutment sleeve, the application of the brake and clutch is not always prompt owing to the liability of slippage of the driven sleeve before a firm grip between the same and the abutment sleeve is effected.

In order to enable the brake and clutch to be applied promptly, the following retarding means are provided:—T represents a split spring ring surrounding the opposing lugs of the two sections of the driven sleeve and having its opposite circumferential edges beveled, as shown at $t$ in Figs. 1 and 11, so that the ring tapers radially outward. These beveled edges are adapted to engage with correspondingly beveled edges or shoulders $t^1$ on the opposing edges of the driven sleeve sections. The split retarding ring is caused to turn with said sleeve sections by a radial pin $u$ connected at its outer end with the spring ring while its inner end engages with a recess $u^1$ formed in the opposing sides of two of the coöperating lugs of said sleeve sections, as shown in Figs. 3, 10 and 11. While the driven sleeve is moved inwardly into engagement with the abutment sleeve the sections of the driven sleeve separate and only the inner member thereof is operative during the application of the brake, while the outer section is released from the hub barrel. During this separated condition of the driven sleeve sections the split ring is free to expand and bears against the bore of the abutment sleeve and operates to produce a frictional coupling between the driven and abutment sleeves. Upon turning the driving sleeve forwardly, the gripping of the split ring against the abutment sleeve prevents rotation of the driven sleeve sections until the same have been moved outwardly sufficiently to properly engage the clutch face of the outer member with that of the hub-barrel. During the continued forward movement of the driving sleeve the inner member of the driven sleeve sections continues its outward movement independently of the outer section until the same is arrested by clamping the split ring between these sections. When this occurs the split spring retarding ring is contracted out of engagement with the abutment sleeve by the action of the coöperating beveled faces on the driven sleeve sections and the spring ring, thereby avoiding all contact at this time between moving and stationary parts. During the first part of the backward movement of the driving sleeve only the inner member of the sectional driving sleeve is moved inwardly axially, this being possible owing to the coupled condition of the clutch. As the two members of the driven sleeve separate, the split spring between the same is released and permitted to expand into engagement with the abutment sleeve and the grip of the outer section on the hub barrel is released, so as to uncouple the last-mentioned parts. The grip of the split spring on the abutment sleeve is sufficient to prevent the driven sleeve sections from turning, thereby insuring a quick inward movement of the inner driven sleeve section and a prompt application of the brake.

Instead of constructing the driven sleeve in sections, as shown in Figs. 1 and 10, the same may be constructed in one piece, as shown at $K^2$, $K^3$, in Fig. 12. When the driven sleeve is constructed in one piece, the split spring T is arranged in an annular groove $t^2$ in the driven sleeve and is connected therewith so as to be always operative for causing prompt engagement and disengagement of the driven sleeve with the abutment sleeve but the objectionable wear on the parts and the resistance to the power applied is still present.

In the modified construction shown in Fig. 13, the supplemental friction for holding the driven sleeve against turning while applying either the brake or the clutch is produced by mounting the outer member $K^4$ of the pair of driven sleeve sections on a tubular neck $v$ of the inner section $K^5$ and causing the same to turn together by radial pins $w$ arranged on the neck of the inner section and engaging with openings $w^1$ in the outer section. The latter is provided with two sets of slots $x, x^1$ arranged parallel with the axis of the section, the slots of the two sets alternating with each other and each slot extending from one edge of the section partway toward the opposite edge thereof, thereby enabling this section to expand and contract. As the outer member of the driven sleeve is drawn with its conical face into the conical face of the hub barrel, said member is contracted, thereby withdrawing its periphery from the bore of the abutment sleeve and avoiding the resistance of the abutment sleeve. When said member is moved inwardly out of engagement with the hub barrel, the same expands and engages the bore of the abutment sleeve and couples the driven sleeve frictionally with the abutment sleeve so as to retard or hold the driven sleeve against turning and enable the brake to be applied promptly.

I claim as my invention:

1. The combination of a barrel, two split brake sleeves arranged in said barrel and each provided with a wedge entering the slit of the other, means for holding said sleeves against turning, and means for causing relative longitudinal movement of said sleeves, substantially as set forth.

2. The combination of a hub barrel, a driving sleeve, a clutch device interposed between said driving sleeve and hub barrel, and a brake comprisng two split sleeves arranged in said hub barrel, wedges arranged on the opposing ends of said brake sleeves and each entering the slit of the other sleeve, means for holding said brake sleeves against turning, and means for moving said brake sleeves one lengthwise relatively to the other by motion from the driving sleeve, substantially at set forth.

3. The combination of a hub barrel, a driving sleeve, a clutch device interposed between said driving sleeve and hub barrel, and a brake comprising two split sleeves arranged in said hub barrel, wedges arranged on the opposing ends of said brake sleeves and each entering the slit of the other sleeve, an axle arranged within the brake sleeves, means for holding said brake sleeves against turning consisting of teeth arranged on one of said brake sleeves, and a toothed member secured to the axle and having teeth interlocking with the teeth of said brake sleeves, and means for moving the other brake sleeve lengthwise by movement derived from the driving sleeve, substantially as set forth.

4. The combination of a hub barrel, a driving sleeve, a clutch device interposed between said driving sleeve and hub barrel, and a brake comprising two split sleeves arranged in said hub barrel, wedges arranged on the opposing ends of said brake sleeves and each entering the slit of the other sleeve, an axle arranged within the brake sleeves, means for holding said brake sleeves against turning consisting of teeth arranged on one of said brake sleeves, and a bearing cone for said barrel secured to the axle and provided with teeth which interlock with the teeth of said brake sleeve, substantially as set forth.

5. The combination of a hub barrel, a driving sleeve, a clutch device interposed between said driving sleeve and hub barrel, and a brake comprising two split sleeves arranged in said hub barrel, wedges arranged on the opposing ends of said brake sleeves and each entering the slit of the other sleeve, an axle arranged within the brake sleeves, means for holding said brake sleeve against turning consisting of teeth arranged on one of said brake sleeves, and a toothed member secured to the axle and having teeth interlocking with the teeth of one of said brake sleeves, a conical abutment sleeve having teeth which interlock with teeth on the other brake sleeve, a conical driven sleeve engaging with said abutment sleeve, and a driving sleeve having a screw connection with said driven sleeve, substantially as set forth.

6. The combination of a hub barrel, a pair of split brake sleeves which are held against turning in said barrel and each of which is provided with a wedge which enters the slit in the other, an abutment sleeve which is connected with one of said brake sleeves, a driven sleeve engaging with the abutment sleeve, and a driving sleeve having a screw connection with said driven sleeve, substantially as set forth.

7. The combination of a hub barrel, a pair of split brake sleeves which are held against turning in said barrel and each of which is provided with a wedge which enters the slit in the other, an abutment sleeve having an annular row of lugs which interlock with a similar row of lugs on one of the brake sleeves, a driven sleeve engaging with the abutment sleeve, and a driving sleeve having a screw connection with said driven sleeve, substantially as set forth.

8. The combination of a hub barrel, a pair of split brake sleeves which are held against turning in said barrel and each of which is provided with a wedge which enters the slit in the other, an abutment sleeve having a conical bearing face and provided with an annular row of teeth which interlock with a similar row of teeth on one of said brake sleeves, a driven sleeve having a conical bearing face which engages with that of the abutment sleeve, and a driving sleeve having a screw connection with said driven sleeve, substantially as set forth.

9. The combination of a hub barrel having a conical clutch face provided with longitudinal alternating ribs and grooves, a driven sleeve having a clutch face provided with spiral alternating ribs and grooves, and a driving sleeve having a screw connection with said driven sleeve, substantially as set forth.

10. The combination of a hub having a driven clutch face and a brake face, an operable brake member connected with a non-rotary part and provided with a brake face adapted to engage with said brake face of the hub and provided with a clutch face, a driving member, driven means having a driving clutch face adapted to engage said driven clutch face of the hub and also having a clutch face adapted to engage with the clutch face of said operable brake member, a retarding device which normally forms a connection between said driven member and said non-rotary part, and means for disengaging said retarding device from said non-rotary part when said driving member operates to propel said driven member.

11. The combination of a hub barrel, a brake member arranged within the hub barrel, a driven member composed of two sections one of which is adapted to engage with said barrel and the other with said brake member, means for coupling said sections but permitting longitudinal movement of the same relatively to each other, a driving member having a screw connection with that section of the driven member which engages the brake member, and a retarding device frictionally coupling and uncoupling said driven member and brake member and operated by the longitudinal movement of said driven member sections, substantially as set forth.

12. The combination of a hub barrel provided with a clutch face, a brake member arranged within the hub barrel, a driven member adapted to actuate said brake member and having a clutch face adapted to engage that of the hub barrel, a driving member having a screw connection with said driven member, and a split spring ring connected with the driven member and frictionally engaging said brake member, said driven member comprising a pair of driven sections whereby said split ring is contracted out of engagement from said brake member upon moving said driven sections toward each other and whereby said split ring is expanded into engagement with said brake member upon moving said driven sections away from each other, substantially as set forth.

13. The combination of a hub barrel having a clutch face, a brake member arranged within the hub barrel, a driven sleeve composed of two sections which are adapted to operatively engage with the brake member and the hub barrel respectively, a driving sleeve having a screw connection with said driven sleeve, and a split spring ring connected with said driven sleeve and adapted to engage said brake member, said driven sleeve sections when moved toward each other operating to contract said split ring out of engagement from said brake member and when moved away from each other to permit said ring to expand into engagement with said brake member, substantially as set forth.

14. The combination of a hub barrel having a clutch face, a brake member arranged within the hub barrel, a driven sleeve composed of two sections which are adapted to operatively engage with the brake member and the hub barrel, respectively, and which are loosely connected, a driving sleeve having a screw connection with said driven sleeve, and a split spring ring connected with said driven sleeve and adapted to engage said brake member and having a beveled edge which engages with a corresponding edge on a section of the driven sleeve, substantially as set forth.

15. The combination of a hub barrel having a clutch face, a brake member arranged within the hub barrel, a driven sleeve composed of two sections which are adapted to operatively engage with the brake member and the hub barrel, respectively and which are loosely connected by means of interlocking lugs on the opposing end of said sections, a driving sleeve having a screw connection with said driven sleeve, and a split spring ring connected with said driven sleeve and adapted to engage said brake member and having its opposite edges beveled and engaging with correspondingly beveled edges on the sections of the driven sleeve, substantially as set forth.

16. The combination of a hub barrel having a clutch face, a pair of split brake sleeves arranged within the barrel and each having a wedge which enters the slit of the other, means for holding said brake sleeves against turning connected with one of them, a conical abutment sleeve connected with the other brake sleeve, a driven sleeve consisting of two sections one of which is adapted to engage said clutch face and the other with said abutment sleeve, interlocking lugs arranged on said driven sleeve sections, a split spring ring adapted to engage its periphery with the bore of the abutment sleeve and having its opposite edges beveled and engaging with correspondingly beveled edges on the driven sleeve sections, a pin connecting said spring with said lugs, and a driving sleeve having a screw connection with one member of said sectional driven sleeve, substantially as set forth.

Witness my hand this 21st day of March, 1907.

WILLIAM S. GUBELMAN.

Witnesses:
 THEO. L. POPP,
 E. M. GRAHAM.